C. H. DEMPSEY.
PULVERIZING ATTACHMENT FOR WHEELED PLOWS.
APPLICATION FILED SEPT. 20, 1912.

1,059,283.

Patented Apr. 15, 1913.

Inventor
Charles H. Dempsey

Witnesses

By Victor J. Evans
Attorney

UNITED STATES PATENT OFFICE.

CHARLES H. DEMPSEY, OF WHITMAN, NEBRASKA.

PULVERIZING ATTACHMENT FOR WHEELED PLOWS.

1,059,283.  Specification of Letters Patent. Patented Apr. 15, 1913.

Application filed September 20, 1912. Serial No. 721,457.

*To all whom it may concern:*

Be it known that I, CHARLES H. DEMPSEY, a citizen of the United States, residing at Whitman, in the county of Grant and State of Nebraska, have invented new and useful Improvements in Pulverizing Attachments for Wheeled Plows, of which the following is a specification.

This invention relates to pulverizing attachments for wheeled plows and has for an object to provide an attachment of this character which will include a portable draft frame which is adapted to travel at one side of the plow and which will include fixed pulverizing means and revolving coöperating pulverizing means which will be disposed in such receiving path of the shovel of the plow that the dirt will be positively fed between the coöperating pulverizing means to thoroughly pulverize the soil as it is excavated.

Figure 1:
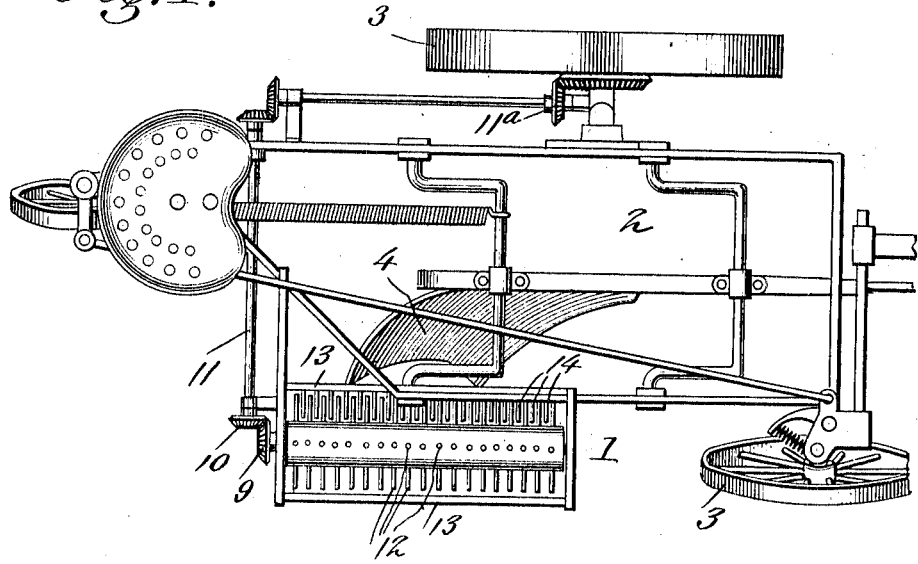
Figure 2:
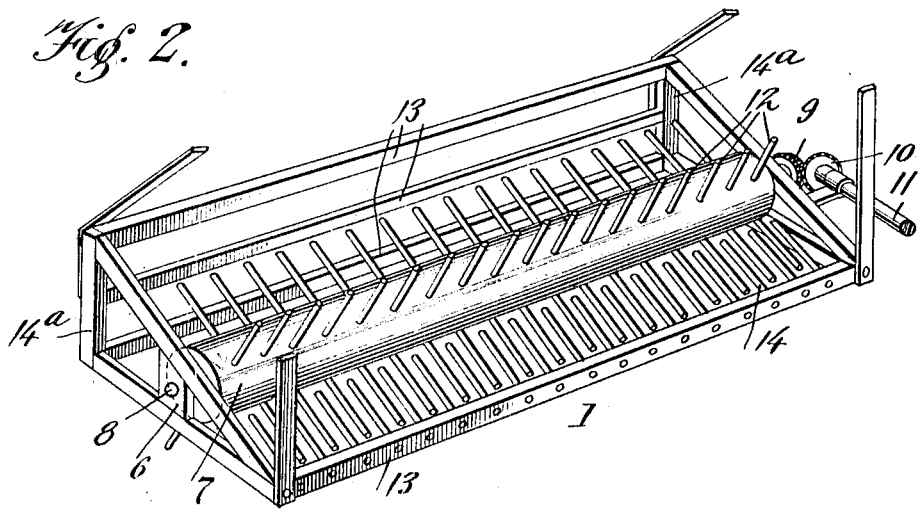

In the drawing forming a portion of this application, and in which like letters of reference indicate similar parts in the several views:—Figure 1 is a plan view of a riding plow, showing the application of the pulverizing attachment thereto; and Fig. 2 is a section on line 2—2 of Fig. 1.

The pulverizing attachment which preferably comprises a rectangular frame 1 is mounted at one side of a riding plow 2, the latter having the usual supporting wheels 3 and a shovel 4. The frame 1 is attached to the frame of the riding plow at one side thereof and in such proximity to the shovel of the plow as to effectually receive the soil therefrom for a purpose to be hereinafter explained.

Journaled preferably in bearings 6 upon the ends of the frame is a drum 7, the axle 8 thereof being provided at one end with a gear wheel 9 which meshes with a gear wheel 10 of a driven shaft 11. This shaft is geared to the driving axle of the riding plow as at 11$^a$ whereby as the plow is propelled across the field motion will be imparted to the shaft 11 with a resultant driving of the drum 7. The drum forms the movable cutting means of the pulverizer and it is preferably provided with longitudinal rows of radially disposed cutting teeth 12. The fixed cutting means of the pulverizer includes the side bar 13 of the frame of the attachment 1 and a plurality of spurs 14, which are tangentially disposed with relation to the drum 7 and spaced relatively so that as the drum is revolved the teeth 12 thereof will be made to pass between the said fixed spurs.

The outer side of the frame 1 comprises spaced longitudinal bars 13, which are secured to the corner uprights 14$^a$ of the frame. The bars 13 form substantially a guard grating immediately at the receiving end of the pulverizing roller 7, so as to prevent displacement of the soil as it is thrown from the shovel 4 of the plow. The construction is also such that the soil becomes congested in the frame 1 at a point between said guard grating and the roller so that an abundance of the soil will lie in the effective path of the pulverizing teeth 12 of said drum. In this manner the soil is agitated before it is finally acted upon by the coöperating teeth 12 and the spurs 14.

From the construction of the pulverizer described it is evident that as the plow is propelled across the field the soil disturbed by the shovel of the plow will be conveyed upon the pulverizing attachment and preferably at a point thereon where it will fall between the spurs 14 and the coöperating spurs 12 of the drum 7. Now from the arrangement disclosed it is evident that the soil will be thoroughly pulverized and the land rendered suitable for an immediate planting of the seed.

Having thus described my invention, what I claim is:

A riding plow, a frame secured to the plow and disposed in the soil discharging path of the shovel thereof, a longitudinal series of spaced pulverizer teeth forming a part of the frame and located at one side thereof, a revolubly mounted drum supported by the frame and provided with teeth extending radial therefrom and adapted to pass between the first teeth, and means for revolving the drum, and a guard disposed at the opposite side of said frame.

In testimony whereof I affix my signature in presence of two witnesses.

CHARLES H. DEMPSEY.

Witnesses:
J. J. VOBORIL,
C. E. WAITE.